(12) United States Patent
Slatkin

(10) Patent No.: US 10,814,842 B2
(45) Date of Patent: Oct. 27, 2020

(54) SYSTEM AND METHOD FOR SIMPLIFIED AIRCRAFT BRAKE DISTANCE ESTIMATION

(71) Applicant: HYDRO-AIRE, INC., Burbank, CA (US)

(72) Inventor: Andrew Brett Slatkin, Tarzana, CA (US)

(73) Assignee: Hydro-Aire, Inc., Burbank, CA (US)

( * ) Notice: Subject to any disclaimer, the term of this patent is extended or adjusted under 35 U.S.C. 154(b) by 230 days.

(21) Appl. No.: 15/852,913

(22) Filed: Dec. 22, 2017

(65) Prior Publication Data

US 2018/0208165 A1    Jul. 26, 2018

Related U.S. Application Data

(60) Provisional application No. 62/439,799, filed on Dec. 28, 2016.

(51) Int. Cl.
| | |
|---|---|
| *B60T 8/17* | (2006.01) |
| *G08G 5/06* | (2006.01) |
| *B60T 7/12* | (2006.01) |
| *B60T 8/32* | (2006.01) |
| *B60T 8/172* | (2006.01) |
| *G08G 5/00* | (2006.01) |
| *B64C 25/42* | (2006.01) |
| *B60T 7/16* | (2006.01) |
| *B61H 1/00* | (2006.01) |

(52) U.S. Cl.
CPC .............. *B60T 8/1703* (2013.01); *B60T 7/12* (2013.01); *B60T 7/16* (2013.01); *B60T 8/172* (2013.01); *B60T 8/32* (2013.01); *B64C 25/426* (2013.01); *G08G 5/0021* (2013.01); *G08G 5/065* (2013.01); *B60T 2210/36* (2013.01); *B61H 1/00* (2013.01)

(58) Field of Classification Search
CPC . B60T 8/1703; B60T 7/16; B60T 7/12; B60T 8/32; B60T 8/172; B60T 2210/36; G08G 5/0021; G08G 5/065; B64C 25/426; B61H 1/00
USPC ........................................................ 701/1, 3
See application file for complete search history.

(56) References Cited

U.S. PATENT DOCUMENTS

| | | | | |
|---|---|---|---|---|
| 4,343,035 | A * | 8/1982 | Tanner ................... | G01C 23/00 244/175 |
| 6,571,195 | B2 * | 5/2003 | Phuyal ................... | G01C 21/20 701/472 |
| 7,436,322 | B2 * | 10/2008 | Crank ................. | B64D 45/0015 340/945 |
| 7,720,579 | B2 * | 5/2010 | Goodman ............. | B64C 25/426 303/191 |
| 7,818,100 | B2 * | 10/2010 | Goodman ............ | G05D 1/0083 244/111 |

(Continued)

*Primary Examiner* — Jaime Figueroa
(74) *Attorney, Agent, or Firm* — Fulwider Patton LLP

(57) ABSTRACT

A braking system and method utilizing a simplified estimate of a distance between two locations on the earth based on spherical geometry. A braking system utilizing the aforementioned simplified estimate does not require computationally intensive calculations and is more efficient and better equipped to handle real-time generation of distance estimates for braking needs and variable conditions. In the present invention, geodesics evaluations are not used; rather, a modified Haversine formula that simplifies computations is used, including a one-time computation of the cosine of latitude coordinate.

23 Claims, 2 Drawing Sheets

(56) References Cited

U.S. PATENT DOCUMENTS

| | | | | |
|---|---|---|---|---|
| 8,355,831 | B2* | 1/2013 | Villaume | G05D 1/0083 244/111 |
| 8,478,460 | B2* | 7/2013 | Hugues | B64C 25/426 701/16 |
| 8,494,692 | B2* | 7/2013 | Valentova | G05D 1/0083 340/973 |
| 2003/0036880 | A1* | 2/2003 | Phuyal | G01C 21/20 702/158 |
| 2005/0192739 | A1* | 9/2005 | Conner | G01S 19/15 701/120 |
| 2005/0261813 | A1* | 11/2005 | Ryan | B64C 25/426 701/16 |
| 2005/0269873 | A1* | 12/2005 | DeVlieg | B60T 8/1703 303/122.03 |
| 2006/0186736 | A1* | 8/2006 | DeVlieg | B60T 8/00 303/126 |
| 2007/0132311 | A1* | 6/2007 | Giazotto | B60T 8/1703 303/126 |
| 2007/0150126 | A1* | 6/2007 | Crank | B64D 45/0015 701/4 |
| 2007/0208466 | A1* | 9/2007 | Meunier | B64C 25/426 701/16 |
| 2010/0299004 | A1* | 11/2010 | Hugues | B64C 25/426 701/16 |
| 2014/0300739 | A1* | 10/2014 | Mimar | H04N 7/188 348/148 |

* cited by examiner

SYSTEM AND METHOD FOR SIMPLIFIED AIRCRAFT BRAKE DISTANCE ESTIMATION

CROSS-REFERENCES TO RELATED APPLICATIONS

This application claims priority from U.S. Provisional Patent Application No. 62/439,799, filed Dec. 28, 2016, the contents of which are incorporated by reference herein in its entirety.

BACKGROUND

Aircraft manufacturers are incorporating new advanced braking systems that are designed to minimize the amount of time that an aircraft occupies an airport runway upon landing. Minimizing runway occupancy time improves the efficiency and safety of the runways and maximizes the use of the airport's resources. To minimize an aircraft's duration of the runway usage, the aircraft must decelerate from its touchdown speed to a safe taxiing speed in the most expeditious manner. For safety and reduced wear and tear on the aircraft, it is important to have the aircraft safely brake in a controlled manner that is neither too quickly nor too slowly. In use, these systems allow a pilot to select a desired runway to land and exit the aircraft, and the braking system will decelerate the aircraft hard enough, but just hard enough, to slow the plane to taxi speed by the turnoff that leads to the desired taxiway or terminal. Once the pilot selects the appropriate runway exit during the approach to landing, the system regulates the aircraft's deceleration after touchdown. This enables the aircraft to reach any chosen exit at the correct speed under optimum conditions, no matter what the prevailing conditions are, including poor weather and visibility. A focus of these new systems is that they optimize the braking so that the aircraft gets to the taxiway intersection sooner (i.e., the aircraft does not decelerate too hard too soon, keeping speed up to minimize time spent on the runway) and also prevents overshooting of the intersection, which would then result in a relatively slow taxi to the next available turn off.

One such system is proposed in U.S. Pat. No. 9,102,404 entitled Method For Controlling The Deceleration On The Ground Of A Vehicle, the contents of which are incorporated herein by reference. In order to determine the appropriate braking force needed to precisely decelerate the vehicle, several parameters must be known. One very important consideration is the determination of a precise distance estimate between vehicle touchdown and exit location/runway overshoot location; furthermore, the distance estimate between the aircraft's current position and the desired exit point would be continuously computed as the aircraft decelerates on the runway. Some navigational systems rely on a branch of spherical mathematics called geodesics to calculate the distances between points on or above the Earth. A common approach is that proposed by Sodano and Robinson in their paper, "Direct And Inverse Solutions Of Geodesics" U.S. Army's Technical Report No. 7. For integration of real-time, braking distance calculations into aircraft that utilize geodesics in the navigation software may require a form of this type of mathematics.

The problem with the use of geodesics to conduct distance calculations is that they require an iterative approach to arrive at a solution, which is taxing on a computational system such as a brake system controller, especially when the computations are required in real-time. In many cases, the distance calculations can overwhelm the system. What is needed is a simplified approach that preserves the necessary accuracy of the braking system runway distance estimates but can reduce the calculations to arithmetic functions rather than iterative functions.

By using a simplified aircraft brake distance estimation, calculations can be performed continuously in real-time that precisely determine and control braking to achieve the desired speed when the aircraft reaches the selected taxiway exit. Additionally, by using this simplified aircraft brake distance estimation, calculations can be used to create a warning of potential runway end excursions and/or initiate braking actions to prevent runway end excursions. These calculations can be used to create a "landing long" warning and aggressively control braking to make up for the shortened available runway distance if an airplane lands too far along the length of the runway. In keeping with this added functionality, these calculations could be used to warn if sufficient runway is not available even prior to touchdown.

SUMMARY OF THE INVENTION

The present invention is a braking system and method utilizing a simplified estimate of a distance between two locations on the earth based on spherical geometry where the distance between the two points is relatively small. A braking system utilizing the aforementioned simplified estimate is more efficient and better equipped to handle rapidly changing estimates for braking needs and variable conditions, making the braking system more robust than prior art systems. In the present invention, geodesics evaluations are replaced with a modified Haversine formula that can include a one-time computation of the cosine of latitude coordinate using, if appropriate, a truncated power series calculation.

These and other features of the present invention will best be understood with reference to the detailed description of the preferred embodiment provided below.

DETAILED DESCRIPTION OF THE PREFERRED EMBODIMENTS

Figure 1:
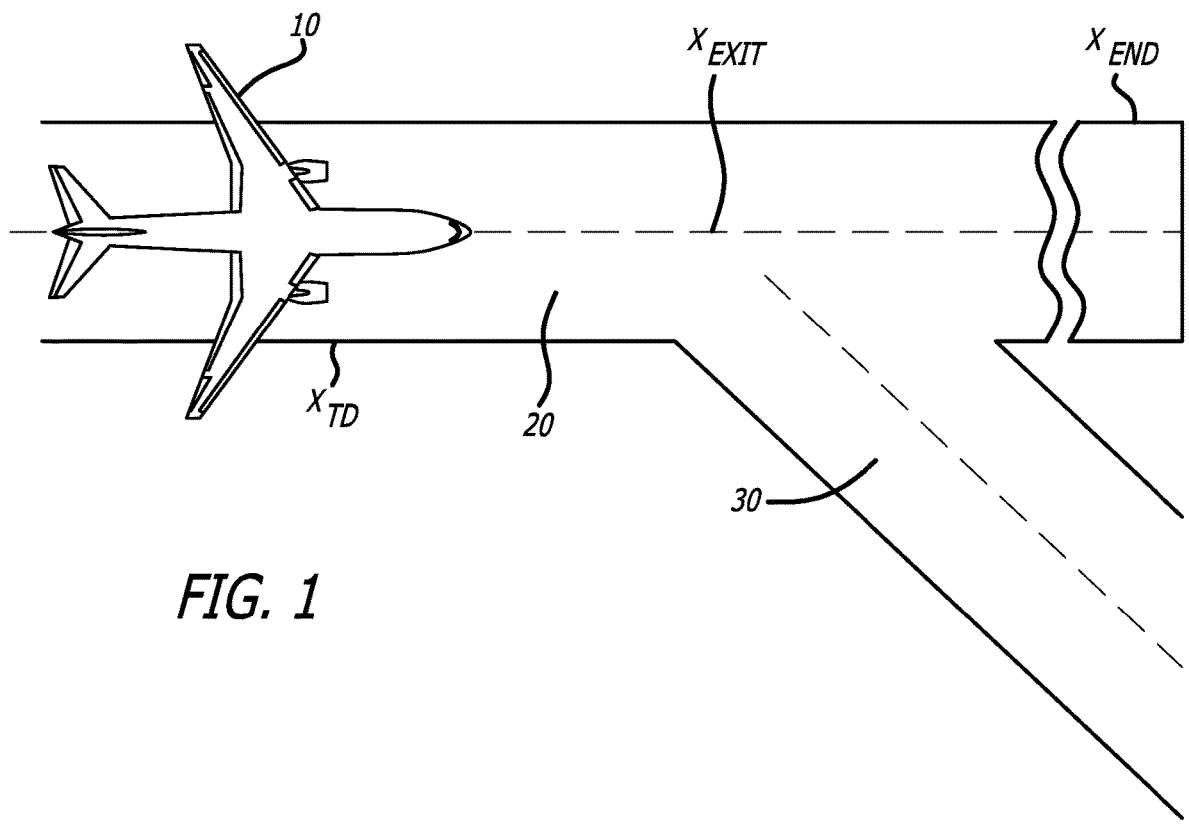
FIG. 1 a top view of an aircraft on a landing strip/airport runway.

FIG. 1 illustrates a first preferred embodiment and application of the present invention, generally depicting an aircraft 10 landing on a runway having an exit ramp 30. We can identify a location on the runway $X_{TD}$ where the aircraft touches down, and this value can be updated to the aircraft's present position on the runway if necessary. The location on the runway where the aircraft must exit the runway is designated $X_{EXIT}$, where the goal is to decelerate the aircraft to the exit location as quickly and as safely as possible to make room for other landing aircraft or aircraft taking off. Therefore, the goal of the invention is to reduce the time that the aircraft takes in getting from $X_{TD}$ to $X_{EXIT}$ while applying all of the necessary safety regulations and factors. That is, the aircraft must be brought from its landing speed to a desired taxiing speed in a manner that minimizes the residency time of the aircraft on runway 20. $X_{END}$ represents the end of the runway for use in generating pilot warnings for potential runway excursions.

The present invention applies a specific braking force using the aircraft's braking system autobrake functionality. When a pilot preselects a taxiway at which the aircraft will exit the designated runway, the autobrake control manages the deceleration in manner such that the aircraft is moving at a preselected velocity as it reaches the runway exit with the minimal amount of time on the runway, within safety and protocol standards. The invention dynamically determines the brake to exit distance using a modified Haversine formula with a small angle approximation that reduces to an arithmetic calculation.

Figure 2:
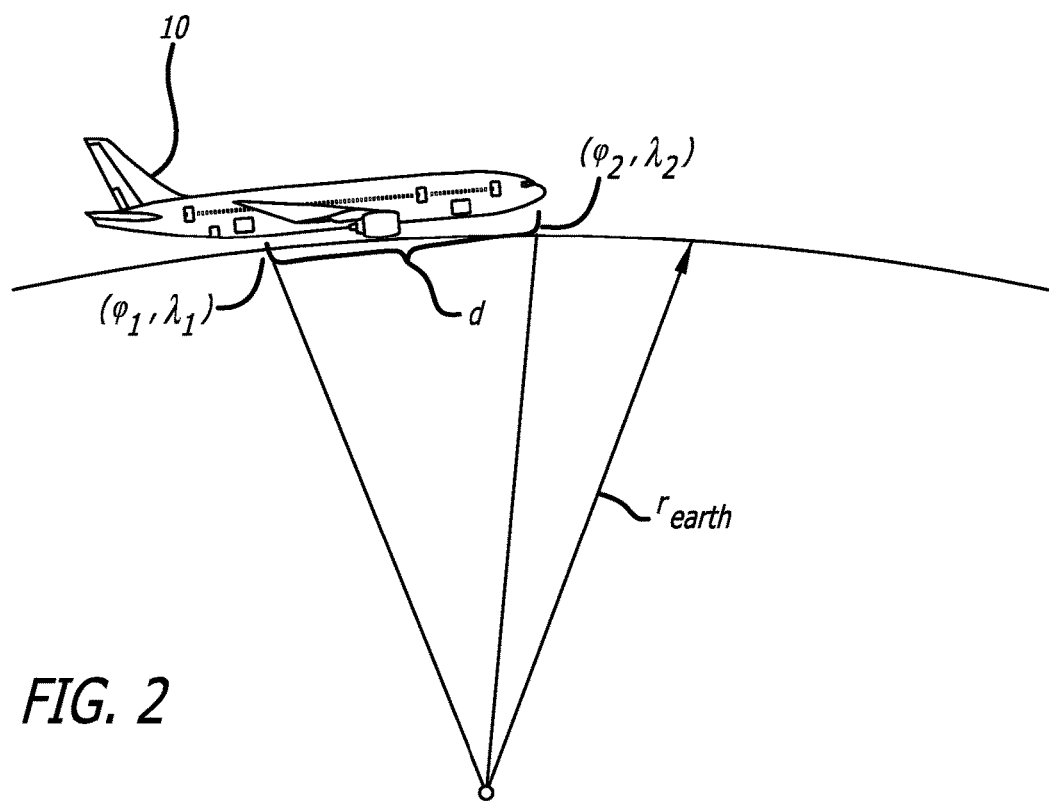
FIG. 2 is a schematic showing the earth's radius and the distance approximation.

For any two points on a sphere, the Haversine of the central angle between them is given by $$hav\left(\frac{d}{r}\right) = hav(\varphi_2 - \varphi_1) + \cos(\varphi_1)\cos(\varphi - 2)hav(\lambda_2 - \lambda_1)$$

where hav is the Haversine function:

$$hav(\theta) = \sin^2\left(\frac{\theta}{2}\right) = \frac{1 - \cos(\theta)}{2}$$

d is the distance between the two points (along a great circle of the sphere; see spherical distance)
r is the radius of the sphere (see FIG. 2),
$\varphi_1$, $\varphi_2$: latitude of point 1 and latitude of point 2, in radians
$\lambda_1$, $\lambda_2$: longitude of point 1 and longitude of point 2, in radians
Solving for d, one can obtain the following formula:

$$= 2r\arcsin\left(\sqrt{\sin^2\left(\frac{\varphi_2 - \varphi_1}{2}\right) + \cos(\varphi_1)\cos(\varphi_2)\sin^2\left(\frac{\lambda_2 - \lambda_1}{2}\right)}\right)$$

This represents the distance between two points on a sphere having an radius r at the respective latitude and longitudes. Note that in relation to the size of the earth, for applications where the distances are on a runway of an airport then $|\varphi_2 - \varphi_1| \ll 1$ and $|\lambda_2 - \lambda_1| \ll 1$. Therefore, the preceding equation can be reduced to $$d = 2r\sin^{-1}\left(\sqrt{\frac{1}{4}(\varphi_2 - \varphi_1)^2 + \frac{\cos\varphi_1 + \cos\varphi_2}{4}(\lambda_2 - \lambda_1)^2}\right)$$

If $|\varphi_2 - \varphi_1| \ll 1$, then $\varphi_2 \approx \varphi_1$ and $\cos \varphi_2 \approx \cos \varphi_1 \rightarrow \cos \varphi_1 \cos \varphi_2 \approx \cos^2 \varphi_1$
This leads to $$d = 2r \sin^{-1}(\frac{1}{2}\sqrt{(\varphi_2 - \varphi_1)^2 + (\cos\varphi_1)^2(\lambda_2 - \lambda_1)^2})$$

Here, the term inside the $\sin^{-1}$ function is much smaller than 1 because $(\varphi_2 - \varphi_1)^2$ and $(\lambda_2 - \lambda_1)^2$ are individually much less than 1, and for any $\varphi_1$, $0 \leq \cos^2 \varphi_1 \leq 1$. Therefore, since for small angles, $\alpha$: $\alpha \approx \sin \alpha \approx \sin^{-1} \alpha$, then the equation further reduces to $$d = 2r(\frac{1}{2})\sqrt{(\varphi_2 - \varphi_1)^2 + (\cos\varphi_1)^2(\lambda_2 - \lambda_1)^2}$$

$$d = r\sqrt{(\varphi_2 - \varphi_1)^2 + (\cos\varphi_1)^2(\lambda_2 - \lambda_1)^2}$$

Since $\cos^2 \varphi_1 = \frac{1}{2}[1 + \cos 2\varphi_1]$, the equation can also be written as $$d = \sqrt{(\varphi_2 - \varphi_1)^2 + \frac{1}{2}[1 + \cos 2\varphi_1](\lambda_2 - \lambda_1)^2}$$

The cosine term in this equation can be evaluated using a look-up table of values stored in a a memory of the braking system's processor, or other known approximations for the trigonometric function. Since this term is a constant throughout the braking run, it only has to be computed or looked up once at or before the beginning of the braking run.

Also, the cosine function can be written as a power series:

$$\cos \varphi_1 = 1 - (\frac{1}{2!})[\varphi_1^2] + (\frac{1}{4!})[\varphi_1^4] - \ldots$$

Thus, another method for approximating the cosine term in the distance calculation would be to compute it to sufficient accuracy using an appropriate number of terms of this power series. Using a truncated power series approximation for the cosine term (done only once per braking run), the simplified distance equation is therefore reduced to a number of arithmetic calculations that can easily be handled dynamically by a brake control system processor.

The aircraft's navigation system provides longitude and latitude coordinates, $\varphi$s and $\lambda$s, as necessary to complete the calculations for the distance determination. With the simplification described above, there are no iterative computations needed and the distance can be readily determined quickly and without undue computational processing.

Figure 3:
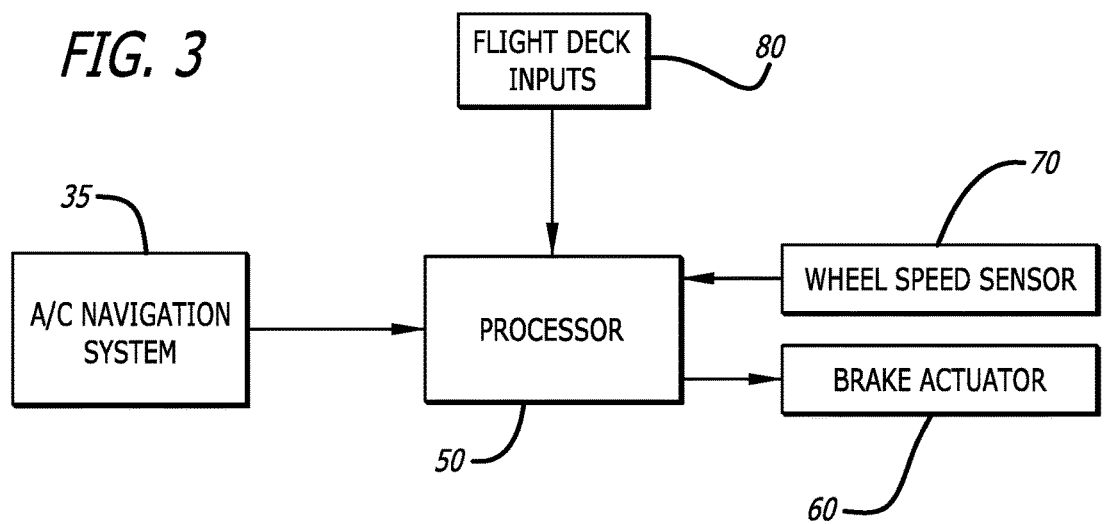
FIG. 3 is a schematic diagram of a system for applying a braking force to a landing gear.

To implement an autobraking system that utilizes the foregoing approximations, FIG. 3 illustrates a schematic diagram of a processor 50 of an aircraft's braking system that is equipped with a distance approximation module using the Haversine approximation. The aircraft's navigation system 35 provides geodetic data to the processor 50, which converts the data to a position of the aircraft on the earth's spherical surface. Using known positions of the runway exits, the distance upon touchdown to the runway exit can be determined using the power series approximation of the cosine of $\theta$. Once the distance is obtained to the runway exit, the processor 50 calculates the necessary deceleration and sends the appropriate commands to a braking actuator 60 to apply a braking force to the aircraft wheels. The processor can also receive data from wheel speed sensor 70, and environmental conditions such as runway surface condition, wind speed, temperature, maximum velocity, etc. from flight deck input 80. The processor 50 applies all of the inputs and conditions, and sends the braking commands to brake actuator 60 for decelerating the aircraft according to the minimum residency protocol.

Figure 4:
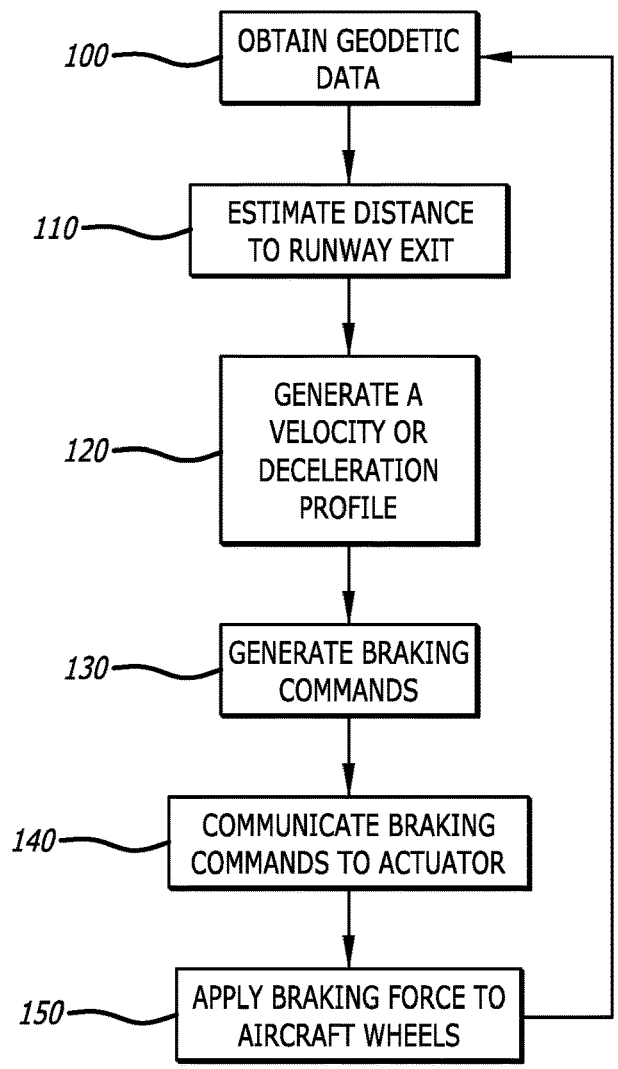
FIG. 4 is a flow chart illustrating a method of the present invention.

FIG. 4 illustrates a flow control diagram for a method of braking the aircraft according to the present invention. In step 100, the aircraft's navigation system provides a current position of the aircraft using geodetic data. In step 110, the braking system determines a distance from its current location to a predetermined runway exit from the geodetic data using a Haversine formula. Once the distance is obtained, the braking system in step 120 generates desired kinematics for the aircraft to travel from touchdown to a runway exit that minimizes the residency time of the aircraft on the runway. In step 130, the velocity profile is used to generate aircraft wheel braking commands using the distance determination and current speed and position of the aircraft. The braking commands are communicated in step 140 to the brake actuator, which in turn applies a braking force to the aircraft wheels consistent with the velocity profile in step 150. Note that other inputs may be preferably incorporated into the processor for determining the velocity profile, including current weather conditions, runway surface conditions, weight of the aircraft, etc.

While the inventor has described some of the preferred embodiments of the present invention, the invention should not be construed so as to be limited to the embodiments depicted and described herein. Rather, the scope of the invention is governed by the appended claims, without limitation to any specific embodiment or illustration.

I claim:

1. A braking system for reducing a speed of an aircraft, comprising:
   a processor, including memory for storing a program for calculating braking parameters;
   a wheel speed sensor communicating with the processor;
   a braking actuator responsive to commands from the processor;
   an aircraft navigation system that provides current aircraft position data and position data for a desired runway exit to the processor in longitude and latitude coordinates; and
   wherein the processor uses a Haversine formula small angle simplification to estimate the distance between a current position and the desired runway exit; and
   wherein the processor commands the braking actuator to reduce the speed of the aircraft based on the estimate of the distance between the current position and the desired runway exit.

2. The braking system for reducing a speed of an aircraft of claim 1, wherein the braking system uses a preselected exit position to determine the braking actuator's reduction of the aircraft speed to minimize a residency time on a runway.

3. The braking system of claim 1, wherein the estimate of the distance between the current position and the desired runway exit computes the cosine of the latitude angle using a truncated power series.

4. The braking system of claim 1, wherein the estimate of the distance between the current position and the desired runway exit computes the cosine of the latitude angle using a lookup table.

5. A method for adjusting instantaneous deceleration of an aircraft to minimize an occupancy of an aircraft on a runway, comprising:
   obtaining a current position of the aircraft after touchdown using geodetic data;
   generating a deceleration profile for the aircraft to travel from touchdown to a desired runway exit with a desired exit taxi speed;
   determining a distance from a current location to a runway exit from the geodetic data using a Haversine formula small angle derivation for distance estimation;
   generating a deceleration profile using the distance estimation and current speed and position of the aircraft;
   and commanding a brake actuator based on the generated deceleration profile.

6. The method of claim 5, wherein the determination of the distance between the current position and the desired runway exit computes the cosine of a latitude angle using a truncated power series.

7. The method of claim 5, wherein the determination of the distance between the current position and the desired runway exit computes the cosine of a latitude angle using a lookup table.

8. A braking system for reducing a speed of an aircraft, comprising:
   a processor, including memory for storing a program for calculating braking parameters;
   a wheel speed sensor communicating with the processor;
   a braking actuator responsive to commands from the processor;
   an aircraft navigation system providing current aircraft position data as well as position data for an end of a runway to the processor in the form of longitude and latitude coordinates; and
   wherein the processor uses a small angle simplification for a Haversine formula to calculate a distance between a current position and the end of the runway; and
   wherein the processor generates a deceleration profile and issues a warning signal if there is potential for a runway overrun/excursion.

9. The braking system of claim 8, wherein the deceleration profile and warning signal are generated prior to and after aircraft touchdown on the runway.

10. The braking system of claim 8, wherein the calculation of the distance between the current position and the end of the runway computes the cosine of the latitude angle using a truncated power series.

11. The braking system of claim 8, wherein the calculation of the distance between the current position and the end of the runway exit computes the cosine of the latitude angle using a lookup table.

12. A method for reducing a speed of an aircraft, comprising:
    obtaining a current position of the aircraft after touchdown using geodetic data;
    generating a deceleration profile for the aircraft to travel from touchdown to a desired runway exit with a desired exit taxi speed;
    determining a distance from a current location to a runway exit from the geodetic data using a Haversine formula small angle derivation for a distance estimation;
    generating a deceleration profile using the distance estimation and current speed and position of the aircraft;
    commanding a brake actuator based on the generated deceleration profile; and
    generating a deceleration profile and issuing a warning signal to the cockpit if there is potential for a runway overrun/excursion.

13. The method of claim 12, wherein the deceleration profile and warning signal are generated prior to and after aircraft touchdown on the runway.

14. The method of claim 12, wherein the calculation of the distance between the current position and the end of the runway computes a cosine of the latitude angle using a truncated power series.

15. The method of claim 12, wherein the calculation of the distance between the current position and the end of the runway computes a cosine of the latitude angle using a lookup table.

16. A braking system for reducing a speed of an aircraft, comprising:
    a processor, including memory for storing a program for calculating braking parameters;
    a wheel speed sensor communicating with the processor;
    a braking actuator responsive to commands from the processor;
    an aircraft navigation system that provides current aircraft position data and position data for an end of a runway to the processor in the form of longitude and latitude coordinates; and
    wherein the processor uses a Haversine formula small angle simplification to calculate a distance between the current position and the end of the runway; and wherein the processor commands the braking actuator to initiate maximum braking force when the processor determines that the aircraft will experience a runway overrun/excursion.

17. The braking system of claim 16, wherein the calculation of the distance between the current position and the end of the runway computes a cosine of the latitude angle using a truncated power series.

18. The braking system of claim 16, wherein the calculation of the distance between the current position and the end of the runway computes a cosine of the latitude angle using a lookup table.

19. The braking system of claim 16, further including a step of generating a warning signal when the processor determines that the aircraft will experience a runway overrun/excursion.

20. A method for reducing a speed of an aircraft, comprising:
   providing a processor, including memory for storing a program for calculating braking parameters;
   locating a wheel speed sensor adjacent a landing gear wheel for communicating with the processor;
   providing a braking actuator responsive to commands from the processor;
   incorporating an aircraft navigation system that provides current aircraft position data and position data for an end of a runway to the processor in the form of longitude and latitude coordinates;
   using a Haversine formula small angle simplification to calculate a distance between a current position and the end of the runway; and
   commanding the braking actuator to initiate maximum braking force when the processor determines that the aircraft will experience a runway overrun/excursion.

21. The method of claim 20, wherein the calculation of the distance between the current position and the end of the runway computes a cosine of a latitude angle using a truncated power series.

22. The method of claim 20, wherein the calculation of the distance between the current position and the end of the runway computes a cosine of a latitude angle using a lookup table.

23. The method of claim 20, further including generating a warning signal when the processor determines that the aircraft will experience a runway overrun/excursion.

* * * * *